(12) United States Patent
Alexeev et al.

(10) Patent No.: US 10,437,509 B1
(45) Date of Patent: Oct. 8, 2019

(54) CREATING CONSISTENT SNAPSHOTS ON SYNCHRONOUSLY REPLICATED STORAGE RESOURCES

(71) Applicant: EMC IP Holding Company LLC, Hopkinton, MA (US)

(72) Inventors: Sergey Alexandrovich Alexeev, St. Petersburg (RU); Alexey Vladimirovich Shusharin, St. Petersburg (RU); Vasu Subramanian, Chapel Hill, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/964,845

(22) Filed: Apr. 27, 2018

(51) Int. Cl.
  *G06F 3/06* (2006.01)
  *G06F 13/16* (2006.01)
(52) U.S. Cl.
  CPC .............. *G06F 3/065* (2013.01); *G06F 3/067* (2013.01); *G06F 3/0619* (2013.01); *G06F 13/1668* (2013.01)
(58) Field of Classification Search
  None
  See application file for complete search history.

(56) References Cited

U.S. PATENT DOCUMENTS

| | | |
|---|---|---|
| 6,823,349 B1 | 11/2004 | Taylor et al. |
| 7,555,504 B2 | 6/2009 | Bixby et al. |
| 8,726,083 B1 | 5/2014 | Van Der Goot |
| 9,087,112 B1 | 7/2015 | Natanzon et al. |
| 9,965,306 B1 | 5/2018 | Natanzon et al. |

*Primary Examiner* — Kevin Verbrugge
(74) *Attorney, Agent, or Firm* — BainwoodHuang

(57) ABSTRACT

Techniques for creating consistent snapshots on synchronously replicated storage resources. The techniques perform such creation of consistent snapshots using snapshot requests that are handled in-band with other IO requests (e.g., write requests, read requests) being processed at a data storage site. By processing snapshot requests as a type of IO request with other IO requests in an IO path to a storage resource, a data storage system can employ the same synchronization logic for efficiently performing both synchronous data replication and synchronous snapshot replication. Further, the disclosed techniques serially process snapshot requests along with write requests that target overlapping sectors of a storage resource according to their order-of-arrival, while concurrently processing write requests that target non-overlapping sectors of the storage resource, thereby reducing repeated pausing and un-pausing of the processing of IO requests received at the data storage system.

20 Claims, 4 Drawing Sheets

CREATING CONSISTENT SNAPSHOTS ON SYNCHRONOUSLY REPLICATED STORAGE RESOURCES

BACKGROUND

Data storage systems typically employ data replication technologies to protect data stored on the data storage systems. Such data replication technologies include synchronous data replication, in which data replication requests are handled in-band with other input/output (IO) requests (e.g., write requests, read requests) being processed at a site of a source storage system (also referred to herein as the "source storage site"). In synchronous data replication, the source storage system typically sends replicas (or copies) of data of storage resources (e.g., logical unit numbers (LUNs), virtual volumes (VVOLs), file systems) specified in data replication requests to a site of a destination storage system (also referred to herein as the "destination storage site"). As employed herein, the term "snapshot" generally refers to a point-in-time (PIT) replication of data of a storage resource (e.g., a LUN, a VVOL, a file system), along with its associated snapshot metadata. Such a snapshot can be a full replica (or copy) of the data stored on the storage resource, a partial copy of the data stored on the storage resource, or a space-efficient copy that includes differences between a current version of the data stored on the storage resource at one PIT and an earlier version of the data stored on the storage resource at a prior PIT.

SUMMARY

While conventional synchronous replication techniques can be used to store replicas (or copies) of data of storage resources from a source storage site at a destination storage site, such conventional synchronous replication techniques may not maintain replicas (or copies) of snapshots of the data stored on the storage resources. For example, when a snapshot of a storage resource is created at the source storage site, a replica (or copy) of the snapshot of the storage resource may not be sent for storage at the destination storage site. However, not storing copies of snapshots of storage resources at the destination storage site may be problematic because it can reduce the amount of protected data available to the source storage system, adversely affecting the source storage system's ability to achieve data recovery in the event of an accident, a disaster, or other catastrophic failure.

One approach to maintaining copies of snapshots of storage resources involves performing backups of data (e.g., storage resource data, snapshot data) stored at the source storage site to the destination storage site, by, for example, using magnetic tape or making bulk copies of the data over a network interconnecting the source storage site with the destination storage site. However, such data backups are generally made out-of-band with the IO requests being processed at the source storage site, and are often directed to different destination storage sites and/or facilities. Even if the source storage system were capable of making copies of snapshots in-band with other IO requests (i.e., even if the source storage system were capable of performing synchronous snapshot replication), it may be necessary to suspend (or pause) such IO requests (e.g., write requests) at one or both of the source storage system and the destination storage system before making the snapshot copies to assure that the respective data storage systems have consistent data. The IO requests may then be subsequently resumed (or un-paused) once consistent snapshot copies are created and stored at the destination storage site. However, repeated pausing/un-pausing of IO requests may not only adversely affect user experiences at the respective data storage systems, but also potentially cause storage applications running on the respective data storage systems to fail.

Techniques are disclosed herein for creating consistent snapshots on synchronously replicated storage resources. The disclosed techniques can perform such creation of consistent snapshots using snapshot requests that are handled in-band with other IO requests (e.g., write requests, read requests) being processed at a source storage site. The disclosed techniques include a write serialization technique that processes each snapshot request as a type of IO request, providing synchronization between the snapshot requests and the other IO requests received at a source storage system. In the event a snapshot request is received at the source storage system, the write serialization technique first processes any pending write requests received at the source storage system that target one or more sectors or regions of a storage resource, writing data to the respective sectors or regions of the storage resource and issuing acknowledgements once the processing of the write requests has completed. Having acknowledged the completion of the processing of the pending write requests, the write serialization technique processes the snapshot request to create a snapshot of the storage resource, and issues an acknowledgement once the processing of the snapshot request has completed. In the event one or more subsequent write requests are received at the source storage system while the snapshot is being created, the write serialization technique pauses processing of the subsequent write requests until the acknowledgement of the completion of the processing of the snapshot request has been issued. Having acknowledged the completion of the processing of the snapshot request, the write serialization technique processes the subsequent write requests to write data to the respective sectors or regions of the storage resource. In the event any of the subsequent write requests or prior pending write requests received at the source storage system target non-overlapping sectors or regions of the storage resource, the write serialization technique processes such write requests concurrently, without pausing any IO request operations at the source storage system.

By processing snapshot requests as a type of IO request with other IO requests (e.g., write requests, read requests) in an IO path to a storage resource, a source storage system can employ the same synchronization logic for efficiently performing both synchronous data replication and synchronous snapshot replication. Further, by serially processing snapshot requests along with write requests that target overlapping sectors or regions of the storage resource according to their order-of-arrival, while concurrently processing write requests that target non-overlapping sectors or regions of the storage resource, repeated pausing and un-pausing of the processing of IO requests received at the source storage system can be reduced.

In certain embodiments, a method of creating consistent snapshots on synchronously replicated storage resources includes receiving a snapshot request at a source storage system. The source storage system includes an input/output (IO) path to a source storage array, and is communicably coupled to a destination storage system that includes a destination storage array. The method further includes ordering the snapshot request with one or more write requests in the IO path to the source storage array. The write requests are directed to a storage resource resident on the source storage array. The method still further includes determining whether at least one of the write requests is pending. Having determined that not one of the write requests is pending, the method includes obtaining a snapshot of the storage resource resident on the source storage array, storing the snapshot in association with a primary image of the storage resource resident on the source storage array, and, having stored the snapshot in association with the primary image of the storage resource, performing remote mirroring to store a copy of the snapshot in association with a secondary image of the storage resource resident on the destination storage array.

In certain aspects, the method includes, having determined that a respective write request among the write requests is pending, temporarily pausing processing of the snapshot request. The respective write request specifies content to be written to the primary image of the storage resource resident on the source storage array. The method further includes writing the content specified by the respective write request to the primary image of the storage resource. Having written the content specified by the respective write request to the primary image of the storage resource, the method includes performing remote mirroring to store a copy of the content specified by the respective write request to the secondary image of the storage resource resident on the destination storage array, and receiving an acknowledgement from the destination storage system that the copy of the content specified by the respective write request has been stored to the secondary image of the storage resource. Having received the acknowledgement from the destination storage system, the method further includes resuming the processing of the snapshot request to obtain the snapshot of the storage resource resident on the source storage array.

In certain further aspects, the method includes receiving a first write request subsequent to receipt of the snapshot request, and ordering the first write request with the snapshot request in the IO path to the source storage array. The first write request is directed to the storage resource resident on the source storage array. The method further includes determining whether the snapshot request is pending, and, having determined that the snapshot request is pending, temporarily pausing processing of the first write request. The method still further includes receiving a first acknowledgement from the destination storage system that the copy of the snapshot has been stored in association with the secondary image of the storage resource resident on the destination storage array, and, having received the first acknowledgement from the destination storage system, resuming the processing of the first write request.

In certain additional aspects, the method includes receiving a second write request subsequent to receipt of the first write request, and ordering the second write request with the first write request in the IO path to the source storage array. The second write request is directed to the storage resource resident on the source storage array. The method further includes determining whether the second write request targets one or more regions of the storage resource that overlap one or more regions of the storage resource targeted by the first write request. Having determined that the second write request targets one or more regions of the storage resource that overlap one or more regions of the storage resource targeted by the first write request, the method includes temporarily pausing processing of the second write request. The first write request specifies content to be written to the primary image of the storage resource resident on the source storage array. The method further includes writing the content specified by the first write request to the primary image of the storage resource. Having written the content specified by the first write request to the primary image of the storage resource, the method includes performing remote mirroring to store a copy of the content specified by the first write request to the secondary image of the storage resource resident on the destination storage array, and receiving a second acknowledgement from the destination storage system that the copy of the content specified by the first write request has been stored to the secondary image of the storage resource. Having received the second acknowledgement from the destination storage system, the method includes resuming the processing of the second write request. In certain other additional aspects, the method includes, having determined that the second write request does not target any regions of the storage resource that overlap one or more regions of the storage resource targeted by the first write request, concurrently processing the first write request and the second write request.

In certain further embodiments, a data storage system includes a source storage system including an input/output (IO) path to a source storage array, and a destination storage system that includes a destination storage array. The destination storage system is communicably coupled to the source storage system. The source storage system is configured to receive a snapshot request, and to order the snapshot request with one or more write requests in the IO path to the source storage array. The write requests are directed to a storage resource resident on the source storage array. The source storage system is further configured to determine whether at least one of the write requests is pending. The source storage system is still further configured, having determined that not one of the write requests is pending, to obtain a snapshot of the storage resource resident on the source storage array, to store the snapshot in association with a primary image of the storage resource, and, having stored the snapshot in association with the primary image of the storage resource, to perform remote mirroring to store a copy of the snapshot in association with a secondary image of the storage resource resident on the destination storage array.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings, in which like reference characters refer to the same parts throughout the different views.

DETAILED DESCRIPTION

Techniques are disclosed herein for creating consistent snapshots on synchronously replicated storage resources.

The disclosed techniques perform such creation of consistent snapshots using snapshot requests that are handled in-band with other IO requests (e.g., write requests, read requests) being processed at a data storage site. By processing snapshot requests as a type of IO request with other IO requests in an IO path to a storage resource, a data storage system can employ the same synchronization logic for efficiently performing both synchronous data replication and synchronous snapshot replication. The disclosed techniques serially process snapshot requests along with write requests that target overlapping sectors or regions of a storage resource according to their order-of-arrival, while concurrently processing write requests that target non-overlapping sectors or regions of the storage resource, thereby reducing repeated pausing and un-pausing of the processing of IO requests received at the data storage system.

Figure 1:
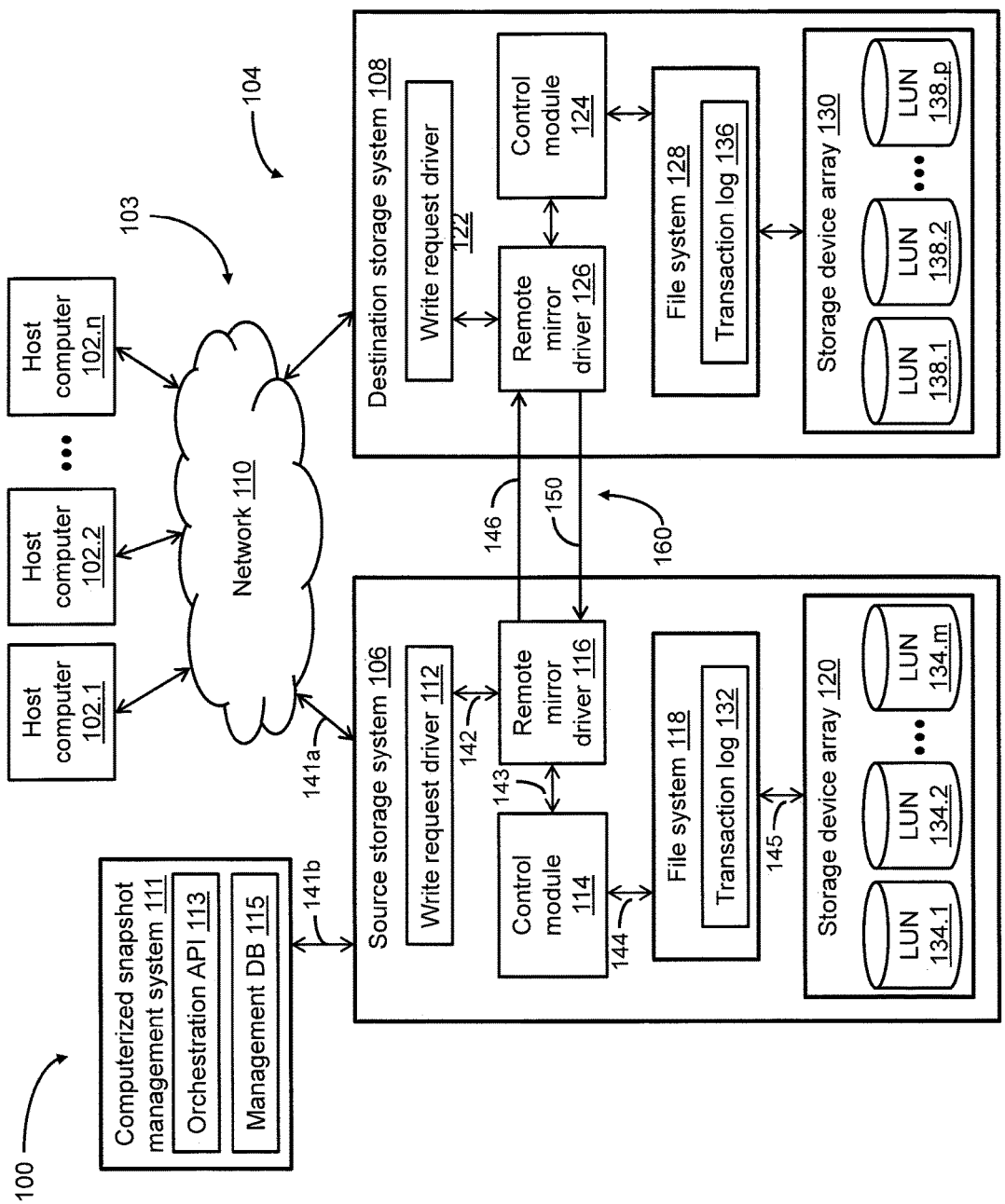
FIG. 1 is a block diagram of a data storage environment, in which an exemplary data storage system configured to create consistent snapshots on synchronously replicated storage resources can be employed.

FIG. 1 depicts an illustrative embodiment of a data storage environment 100, in which an exemplary data storage system 104 configured to create consistent snapshots on synchronously replicated storage resources can be employed. As shown in FIG. 1, the data storage system 104 includes a source storage system 106 and a destination storage system 108. The data storage environment 100 includes a plurality of host computers 102.1, 102.2, . . . , 102.n communicably coupled to the data storage system 104 by a communications medium 103 that includes a network 110. For example, each of the plurality of host computers 102.1, 102.2, . . . , 102.n may be configured as a web server computer, a file server computer, an email server computer, an enterprise server computer, a database server, and/or any other suitable computer or computerized device, for providing input/output (IO) requests (e.g., small computer system interface (SCSI) commands, NFS or CIFS commands) to the data storage system 104 over the communications medium 103. Such IO requests (e.g., write requests, read requests) provided by the plurality of host computers 102.1, 102.2, . . . , 102.n can direct the data storage system 104 to store and/or retrieve blocks of data to/from storage resources (e.g., logical unit numbers (LUNs), virtual volumes (VVOLs), file systems) on behalf of the respective host computers 102.1, 102.2, . . . , 102.n.

The communications medium 103 can be configured to interconnect the plurality of host computers 102.1, 102.2, . . . , 102.n with the data storage system 104 (including the source storage system 106 and the destination storage system 108) to enable them to communicate and exchange electronic signals. As shown in FIG. 1, at least a portion of the communications medium 103 is illustrated as a "cloud" to indicate that the communications medium 103 can have a variety of different topologies including, but not limited to, backbone, hub-and-spoke, loop, irregular, or any suitable combination thereof. The communications medium 103 can also include, but is not limited to, copper-based data communications devices and cabling, fiber optic devices and cabling, wireless devices, or any suitable combination thereof. In addition, the communications medium 103 can be configured to support storage area network (SAN)-based communications, local area network (LAN)-based communications, cellular communications, wide area network (WAN)-based communications, distributed infrastructure communications, and/or any other suitable communications.

As shown in FIG. 1, the source storage system 106 can include a plurality of layered drivers such as a write request driver 112 and a remote mirror driver 116, a control module 114 for controlling the layered drivers 112, 116, a file system 118, and a storage device array 120. The destination storage system 108 can likewise include a plurality of layered drivers such as a write request driver 122 and a remote mirror driver 126, a control module 124 for controlling the layered drivers 122, 126, a file system 128, and a storage device array 130. Each of the write request drivers 112, 122, the control modules 114, 124, the remote mirror drivers 116, 126, and the file systems 118, 128 can be implemented within the data storage system 104 using any suitable computer or processing hardware, software, and/or combination thereof. The source storage system 106 and the destination storage system 108 can be configured to process IO requests from one or more of the host computers 102.1, 102.2, . . . , 102.n, and store host data in a redundant array of independent disk (RAID) environment implemented by the storage device array 120 and the storage device array 130, respectively. In certain embodiments, the source storage system 106 and/or the destination storage system 108 can be configured to store the host data in a cloud-based storage environment or any other suitable data storage environment.

As further shown in FIG. 1, the file system 118 and the file system 128 can include a transaction log 132 and a transaction log 136, respectively, each of which can be implemented as a persistent cache. It is noted that each of the source storage system 106 and the destination storage system 108 can further include persistent memory storage (e.g., flash memory, magnetic memory) and/or non-persistent memory storage (e.g., dynamic random access memory (DRAM), static random access memory (SRAM)), and accommodate a variety of software constructs including, but not limited to, operating system code and data, data storage system code and data, synchronous data replication code and data, and synchronous snapshot replication code and data. The storage device array 120 of the source storage system 106 can store a plurality of storage volumes 134.1, 134.2, . . . , 134.m, each of which can be implemented as a LUN, a VVOL, or any other suitable storage volume or resource. The storage device array 130 of the destination storage system 108 can likewise store a plurality of storage volumes 138.1, 138.2, . . . , 138.p, each of which can be implemented as a LUN, a VVOL, or any other suitable storage volume or resource.

In certain embodiments, the data storage system 104 including the source storage system 106 and the destination storage system 108 can be configured to perform synchronous data replication by executing synchronous mirroring operations. To avoid data loss or unavailability due to an accident or disaster, or maintenance, repair, or failure of one or more storage volumes or resources within the data storage system 104, replicas (or copies) of the data stored on the storage device array 120 of the source storage system 106 can be stored on the storage device array 130 of the destination storage system 108, which can be physically separated from the source storage system 106. For example, the source storage system 106 may be configured to communicate with the destination storage system 108 over a communications link 160 such as a SCSI link, a Fiber Channel link, or any other suitable communications link. In certain embodiments, the destination storage system 108 can be configured as local, logically independent storage (e.g., an isolated storage pool) on the source storage system 106. As employed herein, the term "remote mirroring" (or simply "mirroring") refers to storing copies of host data from the source storage system 106 to the destination storage system 108. Such remote mirroring can permit the source storage system 106 to retrieve host data from the destination storage system 108 in the event the host data on the source storage system 106 is lost or unavailable.

To avoid such data loss or unavailability, the data storage system 104 can be configured to perform remote mirroring to manage multiple images, each consisting of one or more LUNs, VVOLs, file systems, or any other suitable storage resources. The data storage system 104 can maintain multiple mirrors simultaneously, in which each mirror corresponds to a different set of images. For example, with regard to a particular mirror, the data storage system 104 may designate one image on the source storage system 106 as a primary image, and designate another image on the destination storage system 108 as a secondary image. It is noted, however, that, within a data storage system maintaining multiple mirrors, a respective storage system may store a primary image for a first mirror, and a secondary image for a second mirror that is different from the first mirror.

To assure data availability such that host data can be readily retrieved from the destination storage system 108 in the event the host data on the source storage system 106 is lost or unavailable, the secondary image of the host data on the destination storage system 108 must be synchronized with the primary image of the host data on the source storage system 106. In this way, it can be assured that the secondary image of the host data on the destination storage system 108 contains the same information as the primary image of the host data on the source storage system 106. In certain embodiments, the source storage system 106 can be configured to coordinate the synchronization of the primary and secondary images of the host data. For example, one of the host computers 102.1, 102.2, . . . , 102.n may issue a write request over a path 141a to the source storage system 106. Upon receipt of the write request, the source storage system 106 may process the write request in an IO path 142, 143, 144, 145 to the storage device array 120, storing the host data on the storage device array 120 as a primary image of the host data. Concurrent with the processing of the write request in the IO path 142-145, the write request driver 112 may issue, in coordination with the remote mirror driver 116, a further write request over a path 146 of the communications link 160 to the remote mirror driver 126 of the destination storage system 108. Upon receipt of the write request at the remote mirror driver 126, the destination storage system 108 may store a copy of the host data on the storage device array 130 as a secondary image of the host data. Once the secondary image of the host data has been stored on the storage device array 130, the destination storage system 108 may issue an acknowledgement over a path 150 of the communications link 160 to the source storage system 106. Once the processing of the respective write requests to the source storage system 106 and the destination storage system 108 is completed, the source storage system 106 may issue a further acknowledgement over the path 141a to the host computer 102.1, 102.2, . . . , or 102.n that issued the original write request. In certain embodiments, the source storage system 106 can issue the acknowledgement over the path 141a to the respective host computer 102.1, 102.2, . . . , or 102.n once the host data is accounted for in the transaction log 132 of the file system 118, in the event the destination storage system 108 is temporarily unavailable. Such remote mirroring of host data is further described in U.S. Pat. No. 6,823,349 issued Nov. 23, 2004 entitled METHOD AND SYSTEM FOR ESTABLISHING, MAINTAINING, AND USING A PERSISTENT FRACTURE LOG, the disclosure of which is hereby incorporated herein by reference in its entirety.

During operation of the data storage system 104, the source storage system 106 and the destination storage system 108 can not only execute synchronous mirroring operations to perform synchronous data replication, but also execute synchronous mirroring operations to perform synchronous snapshot replication. The data storage system 104 can perform such synchronous snapshot replication by handling snapshot requests in-band with other IO requests (e.g., write requests, read requests) being processed at a source storage site. In certain embodiments, such snapshot requests can be provided by a computerized snapshot management system 111. As shown in FIG. 1, the computerized snapshot management system 111 can include an orchestration application programming interface (also referred to herein as the "orchestration API") 113 and a management database (DB) 115. The orchestration API 113 can be configured to determine at least an overall network configuration of the data storage system 104, as well as the locations of storage resources (e.g., the LUNs 134.1, 134.2, . . . , 134.m, the LUNs 138.1, 138.2, . . . , 138.p) with respect to one or more storage device arrays (e.g., the storage device array 120, the storage device array 130). The management DB 115 can be configured to store at least information pertaining to the network configuration of the data storage system 104, and the locations of the various storage resources within the data storage system 104.

While performing synchronous snapshot replication, the data storage system 104 can process each snapshot request provided by the computerized snapshot management system 111 as a type of IO request, providing synchronization between respective snapshot requests and other IO requests (e.g., write requests, read requests) received at the source storage system 106. As a result, the data storage system 104 can employ the same synchronization logic for efficiently performing both synchronous data replication and synchronous snapshot replication. Moreover, the data storage system 104 can serially process snapshot requests along with write requests that target overlapping sectors or regions of a storage resource according to their order-of-arrival, while concurrently processing write requests that target non-overlapping sectors or regions of the storage resource. As a result, repeated pausing and un-pausing of the processing of IO requests received at the source storage system 106 can be reduced.

Figure 2A:
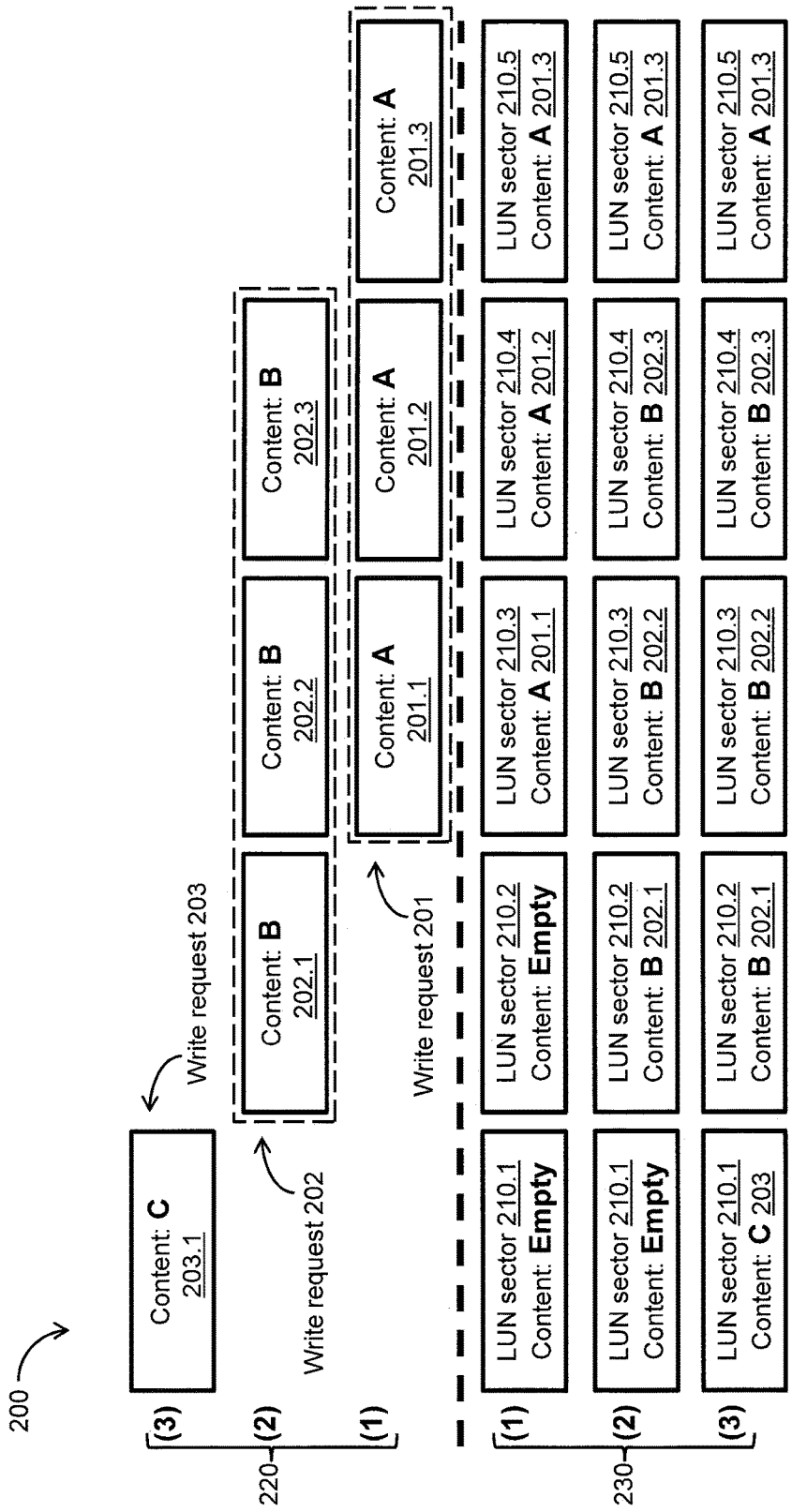
FIGS. 2a and 2b are diagrams illustrating exemplary functionality of the data storage system of FIG. 1 for creating consistent snapshots on synchronously replicated storage resources.
Figure 2B:
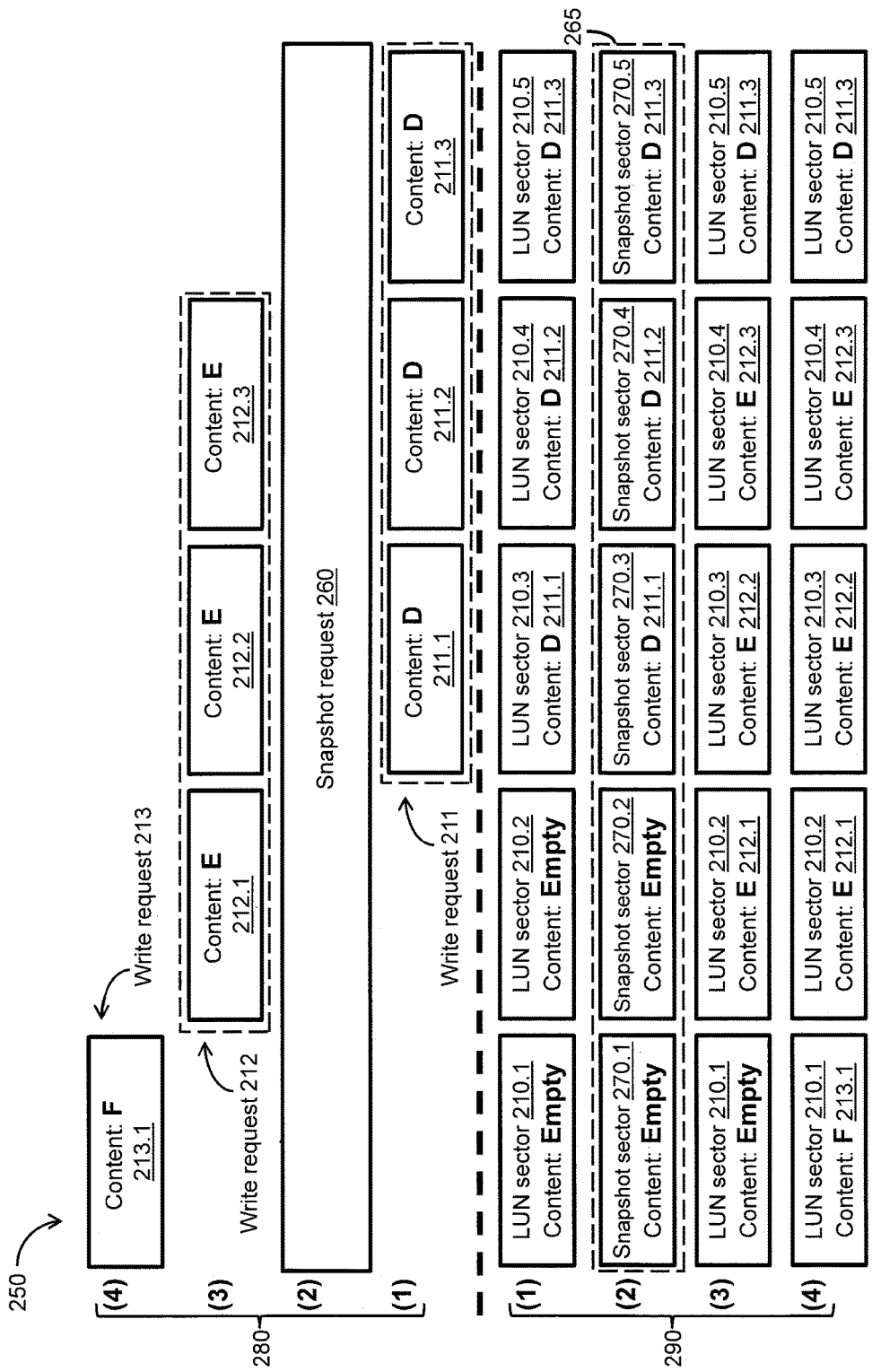

The operation of the data storage system 104 of FIG. 1 for performing synchronous snapshot replication will be further understood with reference to the following illustrative example, as well as FIGS. 2a and 2b. FIG. 2a depicts a plurality of exemplary write requests 201, 202, 203 to a storage resource (e.g., a LUN) of the data storage system 104. For example, the write requests 201, 202, 203 may be provided in a sequence 220 (ordered in accordance with sequence numbers 1, 2, 3) over the path 141a by one or more of the host computers 102.1, 102.2, . . . , 102.n to the source storage system 106. FIG. 2a further depicts a plurality of LUN sectors 210.1, 210.2, . . . , 210.5 that, in response to the write requests 201, 202, 203, can be written to in a sequence 230 (ordered in accordance with sequence numbers 1, 2, 3). For example, the plurality of LUN sectors 210.1, 210.2, . . . , 210.5 may be located on one of the LUNs 134.1, 134.2, . . . , 134.m stored on the storage device array 120, and may correspond to a primary image in a remote mirroring scenario. As shown in FIG. 2a, the write request 201 contains exemplary data content "A" 201.1, 201.2, 201.3, and targets the LUN sectors 210.3, 210.4, 210.5, respectively; the write request 202 contains exemplary data content "B" 202.1, 202.2, 202.3, and targets the LUN sectors 210.2, 210.3, 210.4, respectively; and, the write request 203 contains exemplary data content "C" 203.1, and targets the single LUN sector 210.1.

Having received the write requests 201, 202, 203 over the path 141a, the source storage system 106 assigns the sequence numbers 1, 2, 3 of the sequence 220 to the write requests 201, 202, 203, respectively, according to their order-of-arrival. Because, in this example, no other write request arrived at the source storage system 106 before the write request 201, the source storage system 106 processes the write request 201 in the IO path 142-145 to the storage device array 120, storing the content "A" 201.1, 201.2, 201.3 to the primary image on the storage device array 120 at the LUN sectors 210.3, 210.4, 210.5, respectively (as illustrated with reference to sequence number "1" of the sequence 230). Having stored the content "A" 201.1, 201.2, 201.3 at the LUN sectors 210.3, 210.4, 210.5, respectively, only the LUN sectors 210.1, 210.2 are currently "Empty." Concurrent with the processing of the write request 201 in the IO path 142-145, the write request driver 112 of the source storage system 106 issues, in coordination with the remote mirror driver 116, a first write request over the path 146 to the remote mirror driver 126 of the destination storage system 108. Upon receipt of the first write request at the remote mirror driver 126, the destination storage system 108 stores a copy of the content "A" 201.1, 201.2, 201.3 on the storage device array 130 at appropriate LUN sectors corresponding to a secondary image in the remote mirroring scenario.

While processing the write request 201, the source storage system 106 (i) initiates processing of the write request 202 assigned sequence number "2" of the sequence 220, (ii) determines that the processing of the write request 201 assigned sequence number "1" of the sequence 220 has not yet completed, and (iii) determines that one or more LUN sectors targeted by the write request 202 overlap one or more LUN sectors targeted by the write request 201. As shown in FIG. 2a, the LUN sectors overlapped by the respective write requests 201, 202 correspond to the LUN sectors 210.3, 210.4. The source storage system 106 therefore temporarily pauses the processing of the write request 202 until the processing of the write request 201 in the IO path 142-145, as well as the processing of the first write request issued over the path 146, have completed. In this way, the source storage system 106 initiates serial processing of the write request 201 and the write request 202, ordered in the IO path 142-145 according to their order-of-arrival.

Once the processing of the write request 201 has completed, the source storage system 106 resumes the processing of the write request 202. While processing the write request 202, the source storage system 106 (i) initiates processing of the write request 203 assigned sequence number "3" of the sequence 220, (ii) determines that the processing of the write request 202 assigned sequence number "2" of the sequence 220 has not yet completed, and (iii) determines that no LUN sector targeted by the write request 203 overlaps any of the LUN sectors targeted by the write request 202. As shown in FIG. 2a, the write request 203 targets the single LUN sector 210.1, which does not overlap any of the LUN sectors 210.2, 210.3, 210.4 targeted by the write request 202.

Accordingly, the source storage system 106 concurrently processes the write request 202 and the write request 203, as follows. The source storage system 106 processes the write request 202 in the IO path 142-145 to the storage device array 120, storing the content "B" 202.1, 202.2, 202.3 to the primary image on the storage device array 120 at the LUN sectors 210.2, 210.3, 210.4, respectively (as illustrated with reference to sequence number "2" of the sequence 230). Having stored the content "B" 202.1, 202.2, 202.3 at the LUN sectors 210.2, 210.3, 210.4, respectively, only the LUN sector 210.1 is depicted as being "Empty." Concurrent with the processing of the write request 202 in the IO path 142-145, the write request driver 112 of the source storage system 106 issues, in coordination with the remote mirror driver 116, a second write request over the path 146 to the remote mirror driver 126 of the destination storage system 108. Upon receipt of the second write request at the remote mirror driver 126, the destination storage system 108 stores a copy of the content "B" 202.1, 202.2, 202.3 on the storage device array 130 at appropriate LUN sectors corresponding to the secondary image in the remote mirroring scenario.

Moreover, the source storage system 106 processes, concurrently with the write request 202, the write request 203 in the IO path 142-145 to the storage device array 120, storing the content "C" 203.1 to the primary image on the storage device array 120 at the LUN sector 210.1 (as illustrated with reference to sequence number "3" of the sequence 230). Having stored the content "C" 203.1 at the LUN sector 210.1, not one of the LUN sectors 210.1-210.5 is depicted as being "Empty." Concurrent with the processing of the write request 203 in the IO path 142-145, the write request driver 112 of the source storage system 106 issues, in coordination with the remote mirror driver 116, a third write request over the path 146 to the remote mirror driver 126 of the destination storage system 108. Upon receipt of the third write request at the remote mirror driver 126, the destination storage system 108 stores a copy of the content "C" 203.1 on the storage device array 130 at an appropriate LUN sector corresponding to the secondary image in the remote mirroring scenario. As shown in FIG. 2a with reference to sequence number 3 of the sequence 230, once the concurrent processing of the write requests 202, 203 has completed, the LUN sectors 210.1, 210.2, 210.3, 210.4, and 210.5 contain the content "C" 203.1, "B" 202.1, "B" 202.2, "B" 202.3, and "A" 201.3, respectively.

FIG. 2b depicts another plurality of exemplary write requests 211, 212, 213 to the storage resource (e.g., the LUN) of the data storage system 104, as well as a snapshot request 260 provided by the computerized snapshot management system 111. In this example, the data storage system 104 processes the snapshot request 260 as a type of IO request, providing synchronization between the snapshot request 260 and the write requests 211, 212, 213. For example, the write request 211, the snapshot request 260, the write request 212, and the write request 213 may be provided in a sequence 280 (ordered in accordance with sequence numbers 1, 2, 3, 4). Further, the write requests 211, 212, 213 may be provided over the path 141a by one or more of the host computers 102.1, 102.2, ..., 102.n to the source storage system 106, and the snapshot request 260 may be provided over a path 141b by the computerized snapshot management system 111 to the source storage system 106. FIG. 2b further depicts the plurality of LUN sectors 210.1, 210.2, ..., 210.5 that, in response to the write requests 211, 212, 213, can be written to in a sequence 290 (ordered in accordance with sequence numbers 1, 3, 4), as well as a plurality of snapshot sectors 270.1, 270.2, ..., 270.5 corresponding to the plurality of LUN sectors 210.1, 210.2, ..., 210.5, respectively, that, in response to the snapshot request 260, can be written to in the sequence 290 (in accordance with sequence number 2). As described herein, the plurality of LUN sectors 210.1, 210.2, ..., 210.5 may be located on one of the LUNs 134.1, 134.2, ..., 134.m stored on the storage device array 120, and may correspond to a primary image in a remote mirroring scenario.

As shown in FIG. 2b, the write request 211 contains exemplary data content "D" 211.1, 211.2, 211.3, and targets the LUN sectors 210.3, 210.4, 210.5, respectively; the write request 212 contains exemplary data content "E" 212.1, 212.2, 212.3, and targets the LUN sectors 210.2, 210.3, 210.4, respectively; and, the write request 213 contains exemplary data content "F" 213.1, and targets the single LUN sector 210.1. Having received the write requests 211, 212, 213 over the path 141a and the snapshot request 260 over the path 141b, the source storage system 106 assigns the sequence numbers 1, 2, 3, 4 of the sequence 280 to the write request 211, the snapshot request 260, the write request 212, and the write request 213, respectively, according to their order-of-arrival. Because, in this example, no other write request arrived at the source storage system 106 before the write request 211, the source storage system 106 processes the write request 211 in the IO path 142-145 to the storage device array 120, storing the content "D" 211.1, 211.2, 211.3 to the primary image on the storage device array 120 at the LUN sectors 210.3, 210.4, 210.5, respectively (as illustrated with reference to sequence number "1" of the sequence 290). Having stored the content "D" 211.1, 211.2, 211.3 at the LUN sectors 210.3, 210.4, 210.5, respectively, only the LUN sectors 210.1, 210.2 are currently "Empty." Concurrent with the processing of the write request 211 in the IO path 142-145, the write request driver 112 of the source storage system 106 issues, in coordination with the remote mirror driver 116, a fourth write request over the path 146 to the remote mirror driver 126 of the destination storage system 108. Upon receipt of the fourth write request at the remote mirror driver 126, the destination storage system 108 stores a copy of the content "D" 211.1, 211.2, 211.3 on the storage device array 130 at appropriate LUN sectors corresponding to the secondary image in the remote mirroring scenario.

While processing the write request 211, the source storage system 106 (i) initiates processing of the snapshot request 260 assigned sequence number "2" of the sequence 280, and (ii) determines that the processing of the write request 211 assigned sequence number "1" of the sequence 280 has not yet completed. The source storage system 106 therefore temporarily pauses the processing of the snapshot request 260 until the processing of the write request 211 in the IO path 142-145, as well as the processing of the fourth write request issued over the path 146, have completed. In this way, the source storage system 106 initiates serial processing of the write request 211 and the snapshot request 260, ordered in the IO path 142-145 according to their order-of-arrival.

Once the processing of the write request 211 has completed, the source storage system 106 resumes the processing of the snapshot request 260, taking a snapshot 265 of the LUN sectors 210.1, 210.2, 210.3, 210.4, and 210.5 containing the content "Empty," "Empty," "D" 211.1, "D" 211.2, and "D" 211.3, respectively, and storing the snapshot 265 in association with the primary image on the storage device array 120. As shown in FIG. 2b, the snapshot 265 includes a snapshot sector 270.1, a snapshot sector 270.2, a snapshot sector 270.3, a snapshot sector 270.4, and a snapshot sector 270.5 that contain the content "Empty," the content "Empty," the content "D" 211.1, the content "D" 211.2, and the content "D" 211.3, respectively (as illustrated with reference to sequence number "2" of the sequence 290). Concurrent with the storing of the snapshot 265 in association with the primary image on the storage device array 120, the write request driver 112 of the source storage system 106 issues, in coordination with the remote mirror driver 116, a fifth write request over the path 146 to the remote mirror driver 126 of the destination storage system 108. Upon receipt of the fifth write request at the remote mirror driver 126, the destination storage system 108 stores a copy of the snapshot 265 on the storage device array 130 in association with the secondary image in the remote mirroring scenario.

While processing the snapshot request 260, the source storage system 106 (i) initiates processing of the write request 212 assigned sequence number "3" of the sequence 280, and (ii) determines that the processing of the snapshot request 260 assigned sequence number "2" of the sequence 280 has not yet completed. The source storage system 106 therefore temporarily pauses the processing of the write request 212 until the storing of the snapshot 265 in association with the primary image on the storage device array 120, as well as the storing of the copy of the snapshot 265 in association with the secondary image on the storage device array 130, have completed. In this way, the source storage system 106 initiates serial processing of the snapshot request 260 and the write request 212, ordered in the IO path 142-145 according to their order-of-arrival.

Once the processing of the snapshot request 260 has completed, the source storage system 106 resumes the processing of the write request 212. While processing the write request 212, the source storage system 106 (i) initiates processing of the write request 213 assigned sequence number "4" of the sequence 280, (ii) determines that the processing of the write request 212 assigned sequence number "3" of the sequence 280 has not yet completed, and (iii) determines that no LUN sector targeted by the write request 213 overlaps any of the LUN sectors targeted by the write request 212. As shown in FIG. 2b, the write request 213 targets the single LUN sector 210.1, which does not overlap any of the LUN sectors 210.2, 210.3, 210.4 targeted by the write request 212.

Accordingly, the source storage system 106 concurrently processes the write request 212 and the write request 213, as follows. The source storage system 106 processes the write request 212 in the IO path 142-145 to the storage device array 120, storing the content "E" 212.1, 212.2, 212.3 to the primary image on the storage device array 120 at the LUN sectors 210.2, 210.3, 210.4, respectively (as illustrated with reference to sequence number "3" of the sequence 290). Having stored the content "E" 212.1, 212.2, 212.3 at the LUN sectors 210.2, 210.3, 210.4, respectively, only the LUN sector 210.1 is depicted as being "Empty." Concurrent with the processing of the write request 212 in the IO path 142-145, the write request driver 112 of the source storage system 106 issues, in coordination with the remote mirror driver 116, a sixth write request over the path 146 to the remote mirror driver 126 of the destination storage system 108. Upon receipt of the sixth write request at the remote mirror driver 126, the destination storage system 108 stores a copy of the content "E" 212.1, 212.2, 212.3 on the storage device array 130 at appropriate LUN sectors corresponding to the secondary image in the remote mirroring scenario.

Moreover, the source storage system 106 processes, concurrently with the write request 212, the write request 213 in the IO path 142-145 to the storage device array 120, storing the content "F" 213.1 to the primary image on the storage device array 120 at the LUN sector 210.1 (as illustrated with reference to sequence number "4" of the sequence 280). Having stored the content "F" 213.1 at the LUN sector 210.1, not one of the LUN sectors 210.1-210.5 is depicted as being "Empty." Concurrent with the processing of the write request 213 in the IO path 142-145, the write request driver 112 of the source storage system 106 issues, in coordination with the remote mirror driver 116, a seventh write request over the path 146 to the remote mirror driver 126 of the destination storage system 108. Upon receipt of the seventh write request at the remote mirror driver 126, the destination storage system 108 stores a copy of the content "F" 213.1 on the storage device array 130 at an appropriate LUN sector corresponding to the secondary image in the remote mirroring scenario. As shown in FIG. 2*b* with reference to sequence number 4 of the sequence 290, once the concurrent processing of the write requests 212, 213 has completed, the LUN sectors 210.1, 210.2, 210.3, 210.4, and 210.5 contain the content "F" 213.1, "E" 212.1, "E" 212.2, "E" 212.3, and "D" 211.3, respectively.

Figure 3:
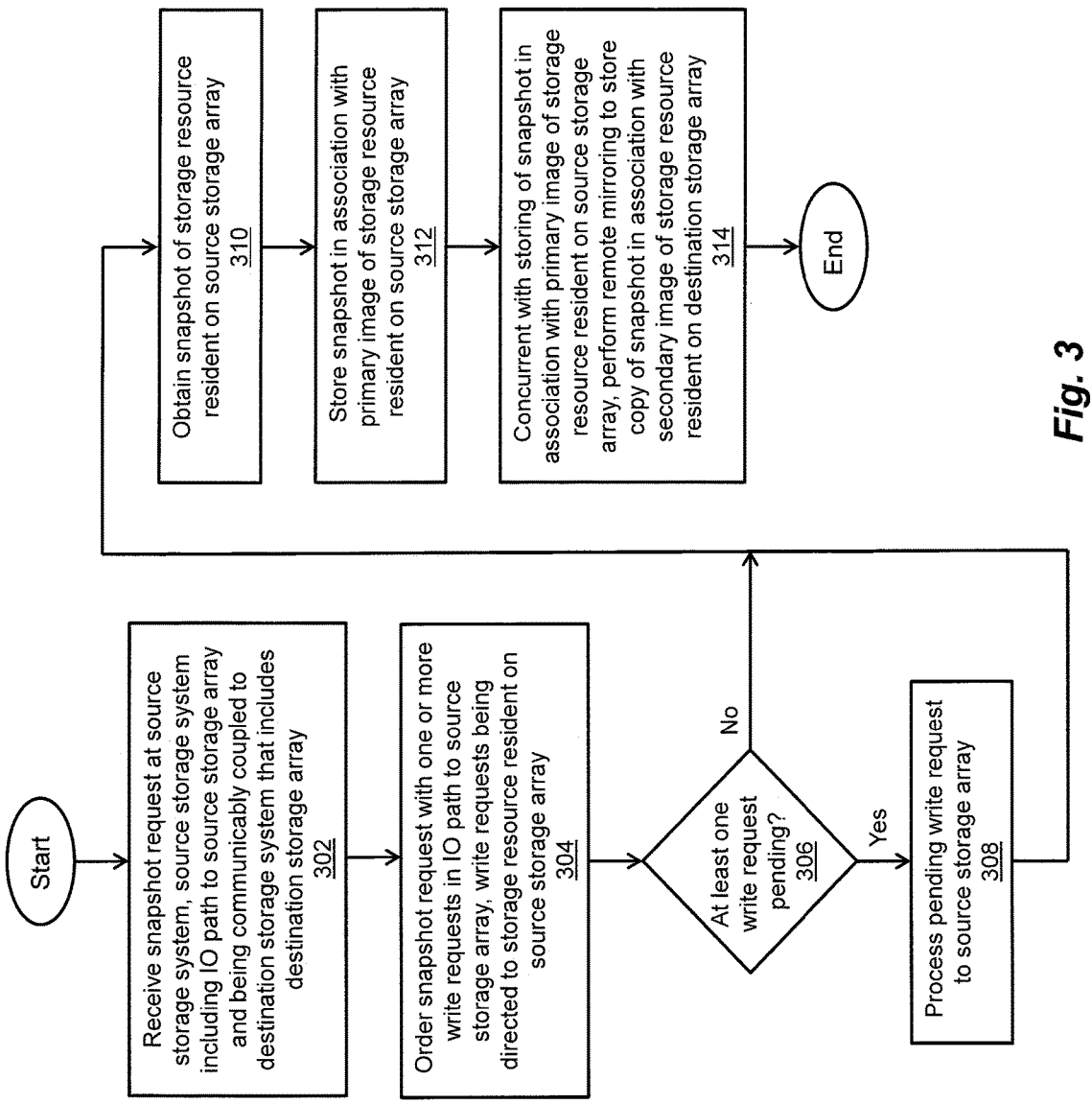
FIG. 3 is a flow diagram of an exemplary method of creating consistent snapshots on synchronously replicated storage resources, using the data storage system of FIG. 1.

An exemplary method of creating consistent snapshots on synchronously replicated storage resources is described below with reference to FIG. 3. As depicted in block 302, a snapshot request is received at a source storage system. The source storage system includes an IO path to a source storage array, and is communicably coupled to a destination storage system that includes a destination storage array. As depicted in block 304, the snapshot request is ordered with one or more write requests in the 10 path to the source storage array. The write requests are directed to a storage resource resident on the source storage array. As depicted in block 306, a determination is made as to whether at least one of the write requests is pending. As depicted in block 308, having determined that at least one of the write requests is pending, the pending write request is processed to the source storage array. As depicted in block 310, having determined that not one of the write requests is pending, a snapshot is obtained of the storage resource resident on the source storage array. As depicted in block 312, the snapshot is stored in association with a primary image of the storage resource resident on the source storage array. As depicted in block 314, concurrent with the storing of the snapshot in association with the primary image of the storage resource resident on the source storage array, remote mirroring is performed to store a copy of the snapshot in association with a secondary image of the storage resource resident on the destination storage array.

It is noted that the disclosed systems and methods or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions that, when executed on one or more computers or other processors, perform the process or processes described herein. Such media may be considered articles of manufacture or machines, and may be transportable from one machine to another.

While various embodiments of the invention have been particularly shown and described, it will be understood by those skilled in the art that various changes in form and details may be made therein without departing from the scope of the invention as defined by the appended claims.

What is claimed is:

1. A method of creating consistent snapshots on synchronously replicated storage resources, comprising:
   receiving a snapshot request at a source storage system, the source storage system including an input/output (TO) path to a source storage array, the source storage system being communicably coupled to a destination storage system including a destination storage array;
   ordering the snapshot request with one or more write requests in the IO path to the source storage array, the one or more write requests being directed to a storage resource resident on the source storage array;
   determining whether at least one of the one or more write requests is pending;
   having determined that not one of the write requests is pending, obtaining a snapshot of the storage resource resident on the source storage array;
   storing the snapshot in association with a primary image of the storage resource resident on the source storage array; and
   having stored the snapshot in association with the primary image of the storage resource resident on the source storage array, performing remote mirroring to store a copy of the snapshot in association with a secondary image of the storage resource resident on the destination storage array.

2. The method of claim 1 further comprising:
   having determined that a respective write request among the one or more write requests is pending, temporarily pausing processing of the snapshot request.

3. The method of claim 2 wherein the respective write request specifies content to be written to the primary image of the storage resource resident on the source storage array, and wherein the method further comprises:
   writing the content specified by the respective write request to the primary image of the storage resource resident on the source storage array.

4. The method of claim 3 further comprising:
   having written the content specified by the respective write request to the primary image of the storage resource resident on the source storage array, performing remote mirroring to store a copy of the content specified by the respective write request to the secondary image of the storage resource resident on the destination storage array.

5. The method of claim 4 further comprising:
   receiving an acknowledgement from the destination storage system that the copy of the content specified by the respective write request has been stored to the secondary image of the storage resource resident on the destination storage array, and
   having received the acknowledgement from the destination storage system, resuming the processing of the snapshot request to obtain the snapshot of the storage resource resident on the source storage array.

6. The method of claim 1 further comprising:
   receiving a first write request subsequent to receipt of the snapshot request; and
   ordering the first write request with the snapshot request in the IO path to the source storage array, the first write request being directed to the storage resource resident on the source storage array.

7. The method of claim 6 further comprising:
   determining whether the snapshot request is pending; and
   having determined that the snapshot request is pending, temporarily pausing processing of the first write request.

8. The method of claim 7 further comprising:
   receiving a first acknowledgement from the destination storage system that the copy of the snapshot has been stored in association with the secondary image of the storage resource resident on the destination storage array; and having received the first acknowledgement from the destination storage system, resuming the processing of the first write request.

9. The method of claim 8 further comprising:
receiving a second write request subsequent to receipt of the first write request; and
ordering the second write request with the first write request in the IO path to the source storage array, the second write request being directed to the storage resource resident on the source storage array.

10. The method of claim 9 further comprising:
determining whether the second write request targets one or more regions of the storage resource that overlap one or more regions of the storage resource targeted by the first write request.

11. The method of claim 10 further comprising:
having determined that the second write request targets one or more regions of the storage resource that overlap one or more regions of the storage resource targeted by the first write request, temporarily pausing processing of the second write request.

12. The method of claim 11 wherein the first write request specifies content to be written to the primary image of the storage resource resident on the source storage array, and wherein the method further comprises:
writing the content specified by the first write request to the primary image of the storage resource resident on the source storage array.

13. The method of claim 12 further comprising:
having written the content specified by the first write request to the primary image of the storage resource resident on the source storage array, performing remote mirroring to store a copy of the content specified by the first write request to the secondary image of the storage resource resident on the destination storage array.

14. The method of claim 13 further comprising:
receiving a second acknowledgement from the destination storage system that the copy of the content specified by the first write request has been stored to the secondary image of the storage resource resident on the destination storage array, and
having received the second acknowledgement from the destination storage system, resuming the processing of the second write request.

15. The method of claim 10 further comprising:
having determined that the second write request does not target any regions of the storage resource that overlap one or more regions of the storage resource targeted by the first write request, concurrently processing the first write request and the second write request.

16. A data storage system, comprising:
a source storage system including an input/output (IO) path to a source storage array; and
a destination storage system including a destination storage array, wherein the destination storage system is communicably coupled to the source storage system,
wherein the source storage system is configured:
to receive a snapshot request;
to order the snapshot request with one or more write requests in the IO path to the source storage array, the one or more write requests being directed to a storage resource resident on the source storage array;
to determine whether at least one of the one or more write requests is pending;
having determined that not one of the write requests is pending, to obtain a snapshot of the storage resource resident on the source storage array;
to store the snapshot in association with a primary image of the storage resource resident on the source storage array; and
having stored the snapshot in association with the primary image of the storage resource resident on the source storage array, to perform remote mirroring to store a copy of the snapshot in association with a secondary image of the storage resource resident on the destination storage array.

17. The data storage system of claim 16 wherein the source storage system is further configured:
having determined that a respective write request among the one or more write requests is pending, to temporarily pause processing of the snapshot request, wherein the respective write request specifies content to be written to the primary image of the storage resource resident on the source storage array;
to write the content specified by the respective write request to the primary image of the storage resource resident on the source storage array;
having written the content specified by the respective write request to the primary image of the storage resource resident on the source storage array, to perform remote mirroring to store a copy of the content specified by the respective write request to the secondary image of the storage resource resident on the destination storage array;
to receive an acknowledgement from the destination storage system that the copy of the content specified by the respective write request has been stored to the secondary image of the storage resource resident on the destination storage array, and
having received the acknowledgement from the destination storage system, to resume the processing of the snapshot request to obtain the snapshot of the storage resource resident on the source storage array.

18. The data storage system of claim 17 wherein the source storage system is further configured:
to receive a first write request subsequent to receipt of the snapshot request;
to order the first write request with the snapshot request in the IO path to the source storage array, the first write request being directed to the storage resource resident on the source storage array;
to determine whether the snapshot request is pending;
having determined that the snapshot request is pending, to temporarily pause processing of the first write request;
to receive a first acknowledgement from the destination storage system that the copy of the snapshot has been stored in association with the secondary image of the storage resource resident on the destination storage array; and
having received the first acknowledgement from the destination storage system, to resume the processing of the first write request.

19. A computer program product having a non-transitory computer readable medium that stores a set of instructions to create consistent snapshots on synchronously replicated storage resources, the set of instructions, when carried out by computerized circuitry, causing the computerized circuitry to perform a method of:
receiving a snapshot request at a source storage system, the source storage system including an input/output (IO) path to a source storage array, the source storage system being communicably coupled to a destination storage system including a destination storage array;

ordering the snapshot request with one or more write requests in the IO path to the source storage array, the one or more write requests being directed to a storage resource resident on the source storage array;

determining whether at least one of the one or more write requests is pending;

having determined that not one of the write requests is pending, obtaining a snapshot of the storage resource resident on the source storage array;

storing the snapshot in association with a primary image of the storage resource resident on the source storage array; and having stored the snapshot in association with the primary image of the storage resource resident on the source storage array, performing remote mirroring to store a copy of the snapshot in association with a secondary image of the storage resource resident on the destination storage array.

20. The method of claim 19 further comprising:

having determined that a respective write request among the one or more write requests is pending, temporarily pausing processing of the snapshot request, wherein the respective write request specifies content to be written to the primary image of the storage resource resident on the source storage array;

writing the content specified by the respective write request to the primary image of the storage resource resident on the source storage array;

having written the content specified by the respective write request to the primary image of the storage resource resident on the source storage array, performing remote mirroring to store a copy of the content specified by the respective write request to the secondary image of the storage resource resident on the destination storage array;

receiving an acknowledgement from the destination storage system that the copy of the content specified by the respective write request has been stored to the secondary image of the storage resource resident on the destination storage array, and having received the acknowledgement from the destination storage system, resuming the processing of the snapshot request to obtain the snapshot of the storage resource resident on the source storage array.

* * * * *